United States Patent [19]
Pilet et al.

[11] 3,891,751

[45] June 24, 1975

[54] VACCINES AND PROCESSES FOR THEIR PREPARATION

[75] Inventors: Charles Pilet, Alfortville; Marc Bonneau, Tassin, both of France

[73] Assignee: Institut Merieux, Lyon, France

[22] Filed: Sept. 30, 1971

[21] Appl. No.: 185,345

Related U.S. Application Data

[63] Continuation of Ser. No. 827,930, May 26, 1969, abandoned.

[30] Foreign Application Priority Data

May 28, 1968 Luxembourg............................ 56161

[52] U.S. Cl. ...................... 424/87; 424/86; 424/89; 424/92

[51] Int. Cl. ............................................. C12k 5/00

[58] Field of Search .................... 424/86, 87, 89, 92

[56] References Cited

FOREIGN PATENTS OR APPLICATIONS

| 395,034 | 5/1924 | Germany |
| 905,882 | 3/1954 | Germany |

*Primary Examiner*—Richard L. Huff
*Attorney, Agent, or Firm*—Cushman, Darby & Cushman

[57] ABSTRACT

Non-agglutinogenic vaccines are prepared containing the desired antigen and sufficient corresponding immune serum to saturate the agglutinogenic sites of the antigen.

1 Claim, No Drawings

VACCINES AND PROCESSES FOR THEIR PREPARATION

This is a continuation of application Ser. No. 827,930 filed May 26, 1969, now abandoned.

The present invention relates to vaccines and to processes for their preparation.

The vaccines which are at present usually employed cause the formation, in the receiving organism, of agglutinant antibodies which cannot be distinguished from the antibodies produced by the normal reaction of a non-vaccinated organism against the illness corresponding to the vaccine.

As a result, if for control purposes, for example, the specific antibodies of an illness are investigated, it is in practice not possible to know if one is dealing with a sick organism or with a vaccinated organism.

This confusion can cause particularly serious disadvantages, especially in the case of veterinary medicine and of illnesses which develop slowly where the visible symptoms do not allow a sick organism to be clearly distinguished from a vaccinated organism. This disadvantage is for example particularly marked in the case of brucellosis.

In order to alleviate this disadvantage it has already been proposed to use so-called non-agglutinogenic vaccines which in principle do not give rise to the formation of detectable agglutinant antibodies in the vaccinated organism. A known process for producing such so-called non-agglutinogenic vaccines consists of preparing these vaccines from a microbial strain cultivated in a rough phase. Such known non-agglutinogenic vaccines are not entirely satisfactory because, despite the manufacturing controls to which they are subjected, they give rise in certain cases to the formation of an amount of agglutinant antibodies which cannot be neglected and which can cause organisms which have simply been vaccinated to be considered as being sick.

The present invention makes it possible to obtain, in a simple manner, non-agglutinogenic vaccines which do not give rise to the formation of agglutinant antibodies in the receiving organism, or which only give rise to the formation of an amount of agglutinant antibodies low enough to avoid any confusion between a vaccinated organism and a sick organism. The present invention makes it possible to modify a vaccine in a simple manner so as to cause it to lose its agglutinogenic character, that is to say so as to ensure that the vaccinated organism contains agglutinant antibodies in amounts sufficiently small to be incapable of confusion with the amounts of agglutinant antibodies brought about by the reaction of the organism towards the illness.

The vaccines of the invention also possess the advantage of having a vaccinating strength which is generally greater than that of the previously known vaccines.

The vaccines of the present invention, which do not (or substantially do not) give rise to the formation of agglutinant antibodies in the receiving organism, are formed by the combination of agglutinogenic antigens corresponding to the illness to which immunity is desired with sufficient immune sera to those antigens to saturate all the agglutinogenic sites of the antigens.

The vaccines of the present invention differ from the seroanavaccines of known type by the fact that the purpose of the seroanavaccines is to provide the receiving organism, all at once, with the specific antibodies which allow the organism to combat the illness from which it suffers, and with the antigens which allow it to manufacture its own antibodies, while, according to the present invention, the proportions of antigens and of immune serum are precisely established to permit a non-agglutinogenic vaccine to be obtained. Furthermore, the seroanavaccines of known type are generally obtained by inactivation by means of formaldehyde of a micro-organism followed by the addition of serum, while the vaccines according to the present invention can be made up with inactive antigens of any kind.

To produce the vaccines of this invention, it is preferable to combine the antigen used with a heterologous immune serum, that is to say a serum coming from a different species of animal than that for which the vaccine is intended. In certain cases, however, a homologous immune serum can also be used in combination with the antigen.

The invention is not limited to a vaccine which immunises the organism against any particular illness, but can advantageously be applied to all agglutinogenic vaccines. Thus the invention can be used to produce very diverse types of vaccines such as those against brucellosis, against colibacilli, against salmonellosis, against staphylococci, against streptococci, against tuberculosis, against whooping cough, against cholera, against plague, against Newcastle disease, and against influenza.

The new vaccines can be used both for human and for veterinary purposes.

The antigen used in the invention may be made up on the basis of microbial elements or microbial extracts. It can for example consist of whole bacteria inactivated by means such as formaldehyde, heat, or merthiolate, or of live whole bacteria of an attenuated or avirulent strain. The antigen can also consist of agglutinogenic bacteria which have been subjected to lysis, for example by enzymatic action, by ultrasonics or by chemical means with the aid, e.g. of bases or acids. The antigen can also consist of the walls of bacteria or of an agglutinogenic antigen obtained by extraction.

The serum used in the invention may be either blood serum or lacto serum, the only condition being that it should contain enough antibodies corresponding to the antigen of the vaccine.

In order to determine the amount of immune serum which is necessary to saturate the agglutinogenic sites of the antigen, the following procedure can be adopted: Fixed amounts of agglutinogenic antigen and varying amounts of agglutinant immune serum are poured into a series of test tubes (series No. 1). The tubes containing the mixture of antigen-serum are left at 37°C. Thereafter the serum from each test tube is collected; this can be done by centrifugation if the antigen is in particle form, or by filtration and extraction on a chromatographic column if the antigen is soluble. The sera collected in this way from the series of tubes (series No. 1) are poured into a new series of test tubes (series No. 2) and brought together with fresh fixed amounts of agglutinogenic antigen. The tubes of the new antigen-serum mixture are left for 24 hours at 37°C. The tubes of series 2, in which a fresh agglutination occurs, are those in which the serum used still contains an excess of agglutinant antibodies. The smallest amount of serum which makes it possible again to agglutinise the antigens of the series of tubes No. 2 corresponds to the amount of agglutinant serum necessary to saturate practically all the agglutinant antigens used in series No. 1. It will be seen that this method makes it possible easily to determine in vitro the proportions of antigens and of immune sera which must be used to prepare the vaccines according to the invention.

In order to prepare the vaccine it thus suffices to bring together these corresponding amounts of antigens and of immune serum, preferably with stirring.

According to a variant, it is also possible to bring the antigens together with an excess of immune serum and then to separate the excess serum, for example by filtration. This serum can then be used for other purposes.

By way of example, it has been possible to establish that, in the case of a vaccine against brucellosis, a perfectly non-agglutinogenic vaccine which does not give rise to the formation of any agglutinant antibody is obtained with a proportion of 5 to 10 thousand million of bacteria per ml of immune serum containing 8,000 international units.

The following Examples illustrate the invention.

EXAMPLE 1

Preparation Of A Non-Agglutinogenic Antibrucella Vaccine Using Blood Serum

1. Preparation of the constituents
A. BACTERIA OF THE BRUCELLA GENUS

Either a strain of Brucella, such as for example Brucella abortus strain Buck 19, or a strain of Brucella isolated from an animal carrying Brucella is used. The strain of Brucella chosen is inoculated onto culture media which are either liquid (e.g. broth-serum or tryptose-glycerine broth), or solid (agar-serum, tryptose-glycerine agar). The Brucella strain is inoculated onto twenty culture media of the "sloping agar-serum" type in sterile 1-litre Roux boxes, according to the usual bacteriological technique. The inoculated boxes are placed in an oven at a temperature of +37°C for 4 days. The resulting bacterial colonies are collected by pouring ten millilitres of sterile isotonic physiological saline into each box and suspending the bacteria in the saline. The various bacterial suspensions are collected together in a sterile flask and a bacterial count is carried out by the usual method of dilutions and inoculation onto agar. By using sufficient dilutions, a bacterial suspension containing about one hundred thousand million bacteria per millilitre of suspension is prepared. Five millilitres of the bacterial suspension of this strength are introduced into a centrifuge pot. This sample is centrifuged at high speed for 30 minutes. Two phases are obtained in the centrifuge pot: a liquid supernatant phase, called A; and a pasty phase which sediments, called B.

Phase A is collected in a flask stored at +4°C and checked so as to ensure the total absence of microbial bodies.

Phase B consists of bacterial bodies.

Phase B is withdrawn and re-suspended in ten millilitres of a formaldehyde solution diluted to five parts by weight of formaldehyde per thousand parts by weight of solution. The bacterial suspension containing the formaldehyde is placed in a test tube in a waterbath at a temperature of +58°C for 30 minutes and is then centrifuged for 30 minutes at high speed. Two phases are obtained in the centrifuge tube: a supernatant liquid phase which is discarded; and a bacterial pasty phase which sediments and which is called $B_1$. The phase $B_1$ consists of Brucella which has been inactivated by the heat and the formaldehyde.

The bacterial phase $B_1$ is then collected in a test tube and is re-suspended in the whole of phase A. This latter bacterial suspension (A + $B_1$ is called suspension C and contains approximately five hundred thousand million inactivated Brucella in a volume of about five millilitres.

The bacterial suspension C forms the first constituent of the vaccine of the present invention.
B. ANTIBRUCELLA SERUM An anti-Brucella serum rich in antibodies is obtained by hyper-immunisation of an adult homeothermic animal by means of an agglutinogenic anti-Brucella vaccine.

For example, a suspension of Brucella abortus, strain Buck 19, containing twenty thousand million live bacteria is injected subcutaneously into a two year old sheep which is unscathed by any illness. Similar injections are carried out eight days and fifteen days after the first vaccination. Ten days after the last vaccine injection the fasting animal is bled by puncturing the jugular vein. Two hundred millilitres of blood are withdrawn under sterile conditions into a flask. The blood is allowed to coagulate and the serum is collected in a fresh flask. The serum is inactivated by heating for 30 minutes on a waterbath at +56°C. The sterility of the serum is checked and the agglutinant antibodies of the serum are determined by the Wright slow sero-agglutination method in a test tube. An agglutinant serum containing 8,000 international agglutinant units per millilitre forms the second element of the vaccine of the present invention.

2. Synthesis Stage

The final preparation of the new vaccines is carried out as follows: 5 millilitres of suspension C and 100 millilitres of agglutinant anti-Brucella serum containing 8,000 international agglutinant units are mixed in a sterile flask. The proportions of vaccine and serum are those which were determined in accordance with the method described above.

The mixture is placed on a waterbath at a temperature of +37°C for 60 minutes, then in an oven at 37°C for 24 hours with intermittent, moderate stirring, and finally kept at 4°C for 24 hours. The final material contains five hundred thousand million inactivated Brucella in a volume of 105 millilitres. Its sterility is then checked.

The vaccine prepared in this manner is subjected to the usual checks for harmlessness and effectiveness. It is also subjected to a special check to determine its agglutinogenic character. For this, the vaccine is injected into animals in the serum of which the presence of agglutinin is looked for, for example 15 days, 30 days and 45 days after the injection of the serum. In this way, it was established that the new vaccine did not cause the production of any agglutinin.

EXAMPLE 2

Preparation Of A Non-Agglutinogenic Antibrucella Vaccine Using Lactoserum

1. Preparation of the Constituents
A. BRUCELLA BACTERIA

Bacteria of strain Brucella B 19 are prepared as described in Example 1.
B. THE ANTIBRUCELLA LACTOSERUM The anti-Brucella lactoserum is produced by the following method: The starting point is an inactivated strain of Brucella B 19 and a live strain of Brucella B 19. The following injections are given to a cow which is in lactation: For 2 weeks, two injections per week of one hundred million inactivated Brucella B 19 are given, and then two injections of ten million live Brucella B 19 are given weekly for three weeks. All the injections are given in a mammary teat. Collection of the serum starts 48 hours after the last injection.

The curd is separated from the milk of the cow using rennet and the immunoglobulins are extracted by precipitation with ammonium sulphate. The presence of the antibodies is measured by sero-agglutination. After starting to collect milk from the cow, the injection of ten million live Brucella of strain B 19 twice a week is continued.

The conditions which have just been described above are those which make it possible to obtain essentially a maximum concentration of anti-Brucella antibodies in the serum.

2. Synthesis Stage

The vaccine of the invention is prepared with the aid of the anti-Brucella vaccine prepared under A and the lactoserum prepared under B by the procedure described in Example 1. The vaccine obtained shows similar properties to the vaccine obtained according to Example 1.

EXAMPLE 3

Preparation of a Non-Agglutinogenic Antisalmonella Vaccine

The starting point is the strain Salmonella Pullorum Gallinarum which is cultured on ordinary agar and collected after 48 hours.

A vaccine is then obtained as described in Example 1 and an anti-Salmonella blood serum is prepared as described in Example 1 or an anti-Salmonella lactoserum is prepared as described in Example 2.

The equivalent proportions of vaccine and serum are determined as indicated in Example 1 and the corresponding quantities are then mixed. An efficient and anti-Salmonella vaccine devoid of all agglutinogenic strength is obtained.

EXAMPLE 4

Preparation of a Non-Agglutinogenic Vaccine Against Newcastle Virus

Newcastle virus is cultured on 10 day old embryonic chicken eggs. The virus is injected chorioallantoidally.

Incubation is carried out for 30 hours in an oven at a temperature 38.5°C and then, after withdrawal from the oven, the eggs which have been incubated in this way are at a temperature of 4°C for 12 hours. The chorioallantoidal liquid is then withdrawn and the virus determined by the haemagglutination test.

A vaccine and a serum are produced with the aid of the virus obtained, as described in Example 1, and the equivalent quantities are then determined and the mixture produced, again as described in Example 1.

It is also possible to produce a vaccine according to the invention with the aid of a lactoserum by adapting Example 2.

What we claim is:

1. A non-agglutinogenic non-pathogenic vaccine effective for use in the immunization against brucellosis comprising an immunizing amount of a non-pathogenic antigen corresponding to brucellosis, said antigen being inactivated whole Brucella bacteria, said antigen having essentially all its agglutinogenic sites saturated with an immune serum containing antibodies corresponding to said antigen, said serum being present in amounts essentially just sufficient to saturate said sites.

* * * * *